United States Patent

[11] 3,576,544

[72] Inventors Humberto Cordero, Jr.
Endicott;
Edward G. Drimak, Johnson City; Charles B. Perkins, Jr., Endicott, N.Y.
[21] Appl. No. 768,634
[22] Filed Oct. 18, 1968
[45] Patented Apr. 27, 1971
[73] Assignee International Business Machines Corporation
Armonk, N.Y.

[54] STORAGE PROTECTION SYSTEM
3 Claims, 1 Drawing Fig.

[52] U.S. Cl. .......... 340/172.5
[51] Int. Cl. .......... G06b 7/02, G06f 11/10, G08b 29/00
[50] Field of Search .......... 340/172.5

[56] References Cited

UNITED STATES PATENTS

| | | | |
|---|---|---|---|
| 3,284,776 | 11/1966 | Freedman | 340/172.5 |
| 3,317,898 | 5/1967 | Hellerman | 340/172.5 |
| 3,317,902 | 5/1967 | Michael | 340/172.5 |
| 3,328,765 | 6/1967 | Amdahl et al. | 340/172.5 |
| 3,328,768 | 6/1967 | Amdahl et al. | 340/172.5 |
| 3,377,619 | 4/1968 | Marsh et al. | 340/172.5 |
| 3,377,624 | 4/1968 | Nelson et al. | 340/172.5 |
| 3,432,810 | 3/1969 | Cordero | 340/172.5 |

*Primary Examiner*—Gareth D. Shaw
*Assistant Examiner*—Jan E. Rhoads
*Attorneys*—Hanifin and Jancin and Carl W. Laumann, Jr.

ABSTRACT: A system for protecting data in storage against inadvertent alteration. An access to main storage is preceded by an access to auxiliary storage. A portion of the auxiliary storage address is used to address a local storage unit for a protection key. When main storage is accessed, a portion of the main storage address is used to address the local storage unit for a storage key relating to the addressed area in main storage. The keys are compared and alteration of data at the main storage address is prevented if the keys do not match.

PATENTED APR 27 1971 3,576,544
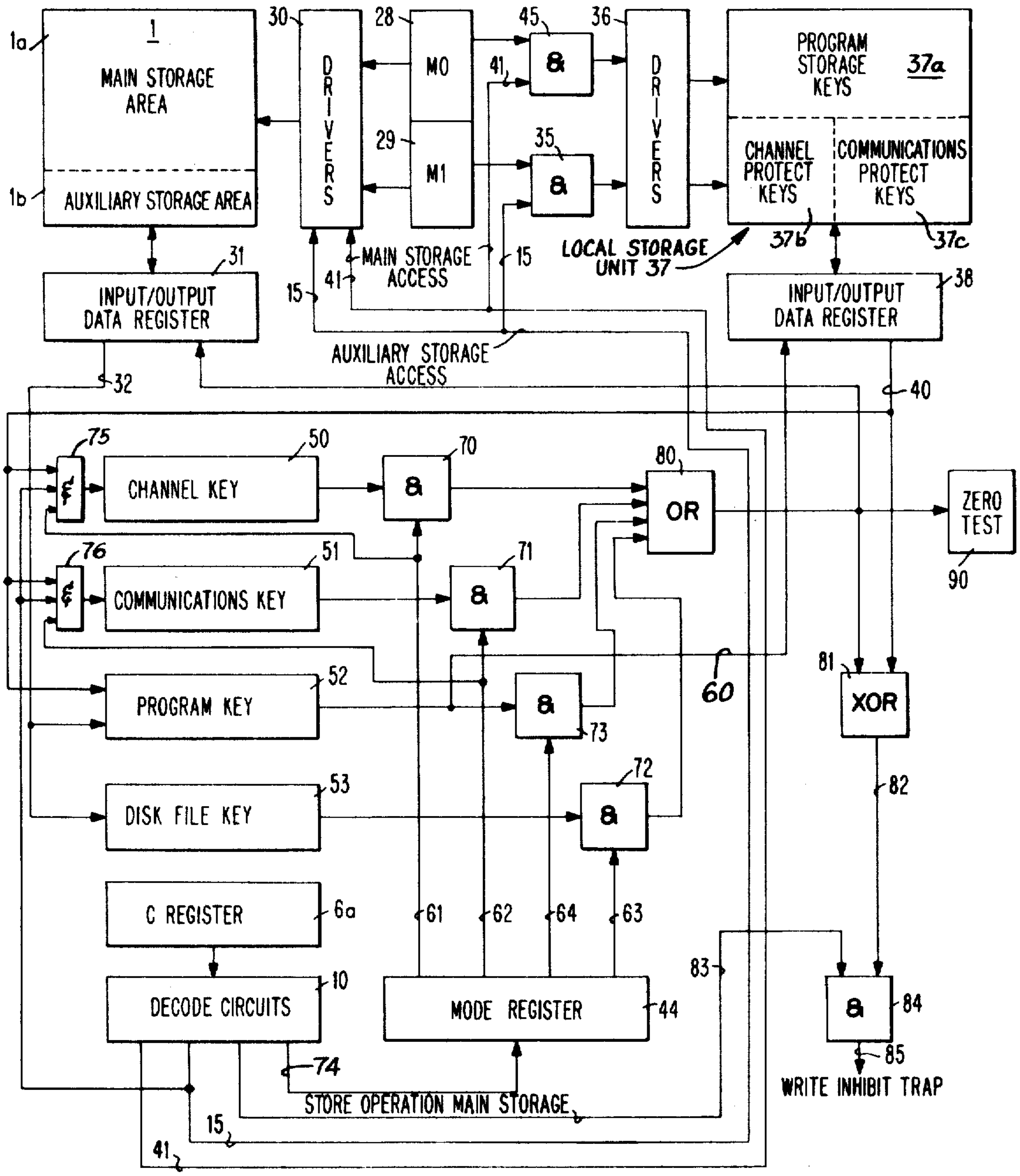
INVENTORS
HUMBERTO CORDERO, JR.
EDWARD G. DRIMAK
CHARLES B. PERKINS, JR.
BY [signature]
ATTORNEY

STORAGE PROTECTION SYSTEM

BACKGROUND OF THE INVENTION

The ability of data processing systems to interleave unrelated manipulations of data increases the opportunity for error. It has been found that inadvertent alteration of data by an incorrect access to storage can be prevented in many cases by comparing a key associated with the program or routine making the access with a key associated with the particular area being accessed. A wide variety of such storage protect systems have been devised.

The identification of the key associated with a particular program may be the subject of an individual instruction. This instruction would appear early in the program and operate to load the appropriate key into a register where it can be subsequently compared with a key identifying a block of storage being accessed. Such a technique is quite acceptable where the key relates to a relatively long series of instructions. However, in the case of routines associated with input/output operations such as channels, the number of instructions may be quite small and the addition of even a single instruction for the purpose of identifying or extracting a key may seriously degrade performance of the system.

SUMMARY OF THE INVENTION

In order to avoid the necessity for adding additional instructions for the purpose of identifying the protection keys used in input/output operations, this system provides a small high-speed local storage unit which contains all the protection keys for input/output operations. This local storage unit is addressed with a portion of the address used to obtain input/output control information from an auxiliary storage unit. Since the keys are contained in a separate storage unit, both auxiliary storage and local storage may be accessed at the same time and no degradation in performance results. Furthermore, it is not necessary to add a separate address register for the local storage unit since the addressing is accomplished by gating selected bit positions from the address register used in accessing main and auxiliary storage to the local storage drivers.

The local storage unit then becomes a convenient place to store the storage keys which are associated with blocks of main storage since the only thing which has to be added to the existing system is the gate circuitry to select other bit positions from the address register used for main and auxiliary storage.

This storage protect system is particularly well adapted for use with data processing systems such as the International Business Machines Corporation System/360 Model 30 and System/360 Model 25. Both of these systems utilize input/output channels of the type described in IBM System/360 Principles of Operations, Form No. A22–6821–3. A detailed description of the channel operation as embodied in the System/360 Model 30 is contained in I/O Control System/360 Model 30, Form No. 225–3362–0. These publications are available from the International Business Machines Corporation. The multiplex mode of channel operation is described in U.S. Pat. No. 3,303,476, "Input/Output Control," assigned to the assignee of this application. U.S. Pat. No. 3,400,371 contains a complete description of the System/360 Model 30. The System/360 Model 25 is described in application immediately No. 695,081 filed Jan. 2, 1968, "Data Processing System," assigned to the assignee of this application.

It is therefore an object of this invention to provide an improved storage protect system.

It is another object of this invention to provide an improved storage protect system for input/output operations.

It is still another object of this invention to provide a storage protect system for input/output operations in which an access to main storage is preceded by an access to an auxiliary storage unit.

The foregoing objects, features and advantages of the invention will be apparent from the following more particular description of a preferred embodiment of the invention, as illustrated in the accompanying drawing.

DESCRIPTION OF THE DRAWING

The drawing is a system diagram of the storage protect system as it operating be embodied in the System/360 Model 25.

DETAILED DESCRIPTION OF THE INVENTION

Channels are commonly used provide communication between the central processing unit (CPU) and input/output (I/O) units such as unit record cards, tape drives and disc files. While the channels are generally located in the CPU, they function to control the I/O devices by means of channel control words. The control words operate to address the particular channel, monitor the status of each I/O operation, specify the main storage address involved in the transfer of data and perform the other essential commands. These commands are executed under micro program control.

Regardless of the particular command structure and sequence of seeking commands, there is a point where a control word, uniquely identified with a particular I/O device, must be addressed. In the case of a multiplexor channel, this control word is called a unit control word (UCW). A unique UCW is available for each I/O device operating on the multiplexor channel. These unit control words, which in the case of the Model 25 are 8 bytes in length, are stored in auxiliary storage locations having addresses which are related to the I/O device address. This allows the unit control word to be fetched from auxiliary storage by means of the device address which is derived earlier in the channel control sequence by the channel micro program.

The unit control word is derived by taking the five low order bit positions of the 8-bit I/O device address and accessing auxiliary storage according to this value. The four low order device address bits are shifted four places to the left so that each succeeding device generates an auxiliary storage address 16 bytes higher than the previous one. The next higher bit in the device address is moved one place to the right so that the 17th and all succeeding devices generate addresses determined by the four low order bits plus 8, at 16 byte intervals.

Where multiple units are used on a channel (shared subchannel), the UCW address is developed from the control unit address. Since the control unit address is contained in the four high order bits of the complete multiple unit address, there is no need to shift bits to obtain the auxiliary storage address. The high order bit is forced to zero and the next 3 bit positions are used to address the auxiliary storage unit for the UCW.

With particular reference to the drawing, the operation of the storage protect system begins when the UCW is fetched from auxiliary storage. The address of the UCW, derived in the manner previously described, is loaded into storage address registers M0 28 and M1 29.

In accordance with the value in C register 6*a*, decode circuits 10 develop output signals which control the various gates and circuits in the system to effect the desired operation. In the case where the value in C register 6*a* indicates that an auxiliary storage access is to be performed, decode circuits 10 generate an output signal on line 15. This signal is applied to the circuitry, including drivers 30, which accesses storage unit 1 to fetch UCW information from the auxiliary storage address contained in M0 and M1 registers 28 and 29.

The UCW information read from auxiliary storage 1*b* appears in input/output data register 31. The auxiliary storage access signal on line 15 is also applied to AND gate 35. This applies the low order portion of the auxiliary storage address in M1 register 29 to drivers 36 associated with local storage unit 37*b* or 37*c*. This arrangement provides for fetching protection keys from local storage unit 37*b* or 37*c* an address corresponding to the address used in fetching unit control word data from auxiliary storage 1*b*. As previously discussed, unit control words are 8 bytes in length and are stored in address locations in auxiliary storage 1*b*. A unique protection key is stored in local storage unit 37*b* or 37*c* for each unit control word in auxiliary storage 1*b*. When the low order portion of the auxiliary storage address appearing in M1 register 29 is used to access local storage units 37b or 37c, each local storage unit address is representative of eight locations of auxiliary storage 1b. followed The data read from local storage unit 37 appears in input/output data register 38. A data bus 40 allows this information to be transferred, under control of the value C register 6a, to other registers and circuits in the system.

In the case where the main storage area is accessed, a similar arrangement allows local storage unit 37 to be simultaneously accessed. The main storage addresses are loaded into M0 and M1 registers 28 and 29 in a conventional manner. The value in C register 6a will be effective to energize the appropriate lines into the decode circuits 10 to produce a Main Storage Access signal on line 41. The signal on line 41 is applied to main storage drivers 30 to access organized main storage address according to the value in M0 and M1 registers 28 and 29. The accessed data will appear in register 31.

The main storage access signal on line 41 is also applied to AND gate 45. This applies the high order bits in the main storage address from M0 register 28 to drivers 36 associated with local storage unit 37. When the high order bits in the main storage address are used to access local storage 37a, each local storage address is representative of a large number of main storage locations. The group of main storage locations which correspond to a single local storage address is termed a block. Each block includes 2,048 addressable locations in the preferred embodiment.

The storage key read from local storage unit 37a during a main storage access appears in data register 38, where it is available for transfer to other registers over bus 40.

The sequence of storage access operations may include an auxiliary storage access for control information prior to the alteration of data at a main storage address. The particular sequence is followed during channel and communications operations since it is necessary to obtain control information from the auxiliary storage location before the remaining sequence of operations can be performed. The execution of general instructions relating to a main program does not generally require an access to auxiliary storage as a prerequisite to the alteration of data. Similarly, certain high-speed input/output operations such as the transfer of data with a disc file are performed on a cycle steal basis without reference to control information in auxiliary storage. In this latter case operation of the circuits not associated with the data transfer is simply suspended for several machine cycles while the transfer is effected.

Each of the four categories of operation has its own storage protection key register: the channel protection key register 50, the communications protection key register 51, program protection key register 52 and disc file protection key register 53. Protection keys may be transferred into the channel, communications and program key registers 50, 51 and 52 from input/output data register 38 associated with local storage unit 37. The disc file key register 53 is loaded over bus 32 from input/output data register 31 associated with main storage 1. This key will normally be loaded by the programmer early in the program sequence and need not be changed. Program key register 52 may also be loaded over bus 32 from input/output register 31 from an instruction associated with the main program. Program key register 52, in addition to its function as a residence for the program key, also serves as a means for transferring data from the main storage area into the local storage unit via bus 60 which appears as an input to the input/output data register 38 associated with local storage 37.

In the case of a channel operation, the auxiliary storage access for control information is effective to read out a channel protection key in the manner previously described. This key is located at an address in local storage unit 37b corresponding to the address of the control information located in auxiliary storage area 1b. The key from local storage unit 37 appears in input/output register 38 from which it is gated into register 50 by means of circuits operating under the control of C register 6a.

Subsequently, a main storage access is made for the purpose of fetching or storing channel information in main storage area 1a. During this type of access, the C register contains a control word which is effective, through decode circuits 10, to provide a main storage access signal on line 41. As previously described, this signal also produces an access to local storage unit 37a and causes a storage key to be placed in input/output register 38. Prior to either the main storage access or the auxiliary storage access, a control word in C register 6a, through decode circuits 10, has set the mode register 44 to a state representative of the type of operation currently in progress; for example, a channel operation, a communications operation, a disc operation or execution of a main program instruction. While the means for setting the mode register is shown as a direct output from decode circuits 10 it will be appreciated that other means will do as well. For example, horizontal circuits 10 may be effective to load mode register 44 with a word from input/output data register 31. In the embodiment illustrated, however, decode circuit 10 monitors a field in a control word in C register 6a and generates a mode signal on line 74 to set mode register 44 to the mode condition specified in the control word in C register 6a. While various means may be used to establish the channel or other modes for mode register 44 from predetermined fields of control words supplied to C register 6a, one particular form for setting the mode register 44 to the channel state is shown in previously mentioned copending application Ser. No. 695,081, where mode register 44 is set to K, where K is a field in the control word. This value setting in effect has set certain bits of mode register 44 to a condition (e.g. 1 1 1) indicating that mode register 44 is in channel mode. Additional details of the manner of setting mode register may be understood by reference to copending application, Ser. No. 695,081. When so set, mode register 44 activates channel line 61 which is connected to AND gate 75 for gating a multibit protection key from input/output register 38 to channel key register 50 in combination with an auxiliary access signal on line 15 from control register 6a.

Mode register 44 has four output lines in addition to other control circuits which are unrelated to the storage protect feature. A channel mode signal on channel line 61 also conditions AND gate 70 to pass the protection key bits from register 50 through OR circuit 80 to one input of Exclusive OR 81. Thus, when a main storage access occurs, a main storage access signal on line 41 is effective to gate the high order bits of the address in registers 28 and 29 to fetch a storage key from local storage unit 37a. This key appears in input/output register 38 from which it is applied as the second input to Exclusive OR 81 over bus 40.

In the event that the two inputs to Exclusive OR 81, the protection key bits contained in register 50 and the storage key bits from an addressed location in local storage unit 37a specified by the value in register 38 corresponding to the accessed block in main storage, do not match, a noncomparison signal will be generated on line 82 from Exclusive OR 81. This noncomparison signal is combined with a Store Operation Main Storage signal on line 83 in AND gate 84. If both inputs to AND gate 84 are present, a write inhibit trap appears on line 85 at the output of AND 84. This signal indicates that the storage protect conditions have not been satisfied and therefore no alteration of data at the accessed location should be made. The signal on line 85 is effective to generate a trap signal which the program can handle in any desired manner. For example, the trap can generate a machine stop signal or enter a subroutine to retry the data transfer.

The performance of the system during a communications operation is essentially the same as that channel operation since in communication mode it is necessary to access auxiliary storage for control information prior to a main storage access for the purpose of altering data.

As in the case of channel operation, access to main storage is preceded by setting mode register 44 to communications mode and by initiating an auxiliary storage access, both under the control of C register 6a. Mode register 44 is set to the communications mode by a control word in C register 6a which contains a field indicating communication operation. Decode circuits 10 monitoring the mode field of this control word condition the mode register 44 by a mode signal on line 74 causing mode register 44 to activate communications line 62, which in turn is connected to AND gate 75 on the input to communications key register 51. Subsequently, in communications mode, auxiliary store access is initiated by a control word applied to C register 6a which is decoded by decode circuits 10 to set an auxiliary access signal on line 15 thereby gating the low order portion of auxiliary store address in M1 register 29 through gate 35 to appropriate drivers 36 for local storage unit 37c. The method of addressing local storage unit 37c is preferably the same as for addressing local storage unit 37b, as previously described. Thus, a protection key for a communication operation is provided for each 8 bytes of a communications unit control word stored in auxiliary storage 1b. A communications mode signal on communication line 62, concurrently with an auxiliary access signal on line 15, conditions AND circuit 75 to gate bits from local storage unit 37c appearing in input/output register 38 into communications key register 51. Since the communications mode signal on line 62 is also applied to AND gate 71, the communications protection key bits contained in register 51 are also gated through OR circuit 80 to one part of Exclusive OR circuit 81.

During the subsequent main storage access for the communication operation, the decode circuits 10 associated with register 6a again generate a main access signal on line 41 which accesses local storage unit 37a for the storage key corresponding to the block address in the main storage area. This storage key appears in input/output data register 38 and is applied as a multibit signal input to Exclusive OR 81 over bus 40. As in the case with channel operations, a noncomparison between the storage and protection keys results in an noncomparison signal on line 82. The noncomparison signal on line 82 is combined with a Store Operation Main Storage signal on line 83 in AND gate 84. In the event that both conditions are present, a Write Inhibit Trap on line 85 is generated to indicate that the protection key is incorrect for the particular block of storage which has been accessed. As in the case of channel operation, this signal may be used to generate a program subroutine which takes corrective action or to stop operation of the machine.

Where a disc file operation is to be performed there is no access to auxiliary storage prior to alteration of data in the main storage unit. It is therefore necessary for the program to load disc file key register 53 with the protection key prior to the performance of any disc file operations. This key will then normally be resident in register 53 for substantially the entire time required for execution of a complete file operation. At the time that a disc file operation is to be performed, a particular control word is forced to the C register 6a. This word is effective, via decode circuits 10 or other equivalent means, to set mode register 44 to a value which generates an output signal on line 63. The signal on line 63 conditions AND gate 72 to pass the disc file protection key from register 53 through OR circuit 80 and apply it as an input to Exclusive OR 81.

During the access of main storage 1a, a signal on line 41 is effective to read out the appropriate storage key from local storage unit 37a. This value appears in input/output data register 38 and is applied as a second input to Exclusive OR 81 over bus 40. As previously described, a lack of correspondence between the storage key and the protection key results in an output signal on line 82 which is combined with a Store Operation Main Storage signal on line 83 in AND gate 84. The output of AND gate 84 on line 85 is utilized to generate an interrupt signal which may be processed in a manner convenient for the completion of the program or to stop operation of the machine.

In addition to the above-described modes of operation, it may be desirable to protect certain blocks of main storage from alteration as part of the general programmed operation. In this case, a program key register 52 is provided which can be loaded with a program key by a general program instruction prior to access of the predetermined blocks of main storage 1a. Such instruction, for example, could direct taking a program key from main storage 1a to input/output data register 31 for loading via bus 32 into key register 52. Further details of how this might be done may be understood by reference to the description in the IBM System/360 Principles of Operations publication, Form No. A22-6821-3, previously mentioned. These program keys for the storage blocks to be protected correspond to the storage keys in the local storage unit 37a relating to the areas of main storage desired to be protected. In this case, the main program will contain an instruction to load program key register 52 with the program protect key prior to access of main storage. The comparison of the protection key and storage key proceeds in a manner quite like that for I/o devices.

Also prior to the main storage access, a control word is placed in control register 6a which contains a program mode field which is decoded by decode circuits 10 to generate a program mode signal on program line 64. This sets mode register 44 to a state which generates a program mode signal on program line 64. The signal on line 64 conditions AND gate 73 to pass the protection key bits via OR circuit 80 to one input of Exclusive OR 81. The value in register 52 will normally remain unchanged for a series of instructions relating to a particular block of storage. However, before a subsequent block of storage is accessed for the purpose of altering data therein, it is necessary to insert a command in the instruction sequence which changes the value in register 52.

Whenever main storage is accessed the main storage access signal on line 41 is effective to gate the high order bits from M0 and M1 registers 28 and 29 to drivers 36 for local storage unit 37a and read out the storage key corresponding to that location. This value then appears in input/output data register 38 from which it is applied as a second input Exclusive OR 81 over bus 40. In the manner previously described, Exclusive OR 81 operates to generate a noncomparison signal on line 82 in the event that the two keys are dissimilar. AND gate 84 combines the Storage Operation Main Storage signal on line 83 with the noncomparison signal on line 82 to generate a write inhibit trap signal on line 85.

It will be appreciated that there will be occasions when the storage protect feature is either not desired or becomes cumbersome to implement in a program. In such situations the value in registers 50, 51, 52 or 53 which contain the protect key, can be set to all zeros. This indicates that no storage protect operation is to be performed. The existence of all zeros in the protect key is detected by zero test circuit 90. This circuit has the effect of overriding any signal which may appear on line 85. The use of all zeros in the protection key is described in U.S. Pat. No. 3,328,768, "Storage Protection Systems," assigned to the assignee of this application.

Since there will be occasions when it is necessary to determine the value of a particular key in local storage unit 37, a data path has been provided from the output of OR circuit 80 to input/output data register 31. The value in any one of the registers 50—53 can be gated by the appropriate value in mode register 44 through one of the AND gates 70—73 and OR circuit 80 through the input/output data register 31. From this location it may be displayed in the same manner as data which normally appears in this register.

The Store Operation Main Storage signal on line 83 is derived by means of decode circuits 10 from a particular value in the control register 6a.

While the invention has been particularly shown and described with reference to a preferred embodiment thereof, it will be understood by those skilled in the art that the foregoing and other changes in form and details may be made therein without departing from the spirit and scope of the invention.

We claim:

1. In a data processing system having a main data storage unit containing data, and means for accessing data in said main data storage unit, means for developing a signal useable for protecting data, in predetermined areas of said main storage unit, from inadvertent alteration, comprising, an auxiliary storage unit containing information relating to data, at a main storage address, which is accessed by said main storage unit accessing means, means for accessing said information in said auxiliary storage unit, a local storage unit, means for fetching a protection key from the local storage unit with a portion of the address utilized in accessing said information from said auxiliary storage unit, a plurality of protection key registers, means for selecting a protection key register for receiving a protection key fetched by said protection key fetching means, means for transferring a key fetched by said protection key fetching means from said local storage unit into a selected one of said protection key registers, means for fetching a storage key from the local storage unit with a portion of the address utilized in accessing said main storage unit, comparison means, including a mode register, for comparing a protection key within a register selected by said selection means to a storage key fetched by said storage key fetching means in accordance with the address utilized in accessing said main storage unit, means, responsive to a noncomparison signal from said comparison means, for developing a signal for preventing alteration of data at an accessed location within said main storage unit.

2. In a data processing system having a main data storage unit containing data, means for accessing data in said main data storage unit, and means relating to an input/output operation for developing a signal useable for protecting data in predetermined areas of said main storage unit from inadvertent alteration, comprising, an auxiliary storage unit containing control information, relating to an input/output operation, which is accessed by said main storage unit accessing means, means for accessing said control information in said auxiliary storage unit, a local storage unit, means for fetching a protection key from the local storage unit with a portion of the address utilized in accessing said control information from said auxiliary storage unit, a plurality of protection key registers, means for selecting a protection key register for receiving a protection key fetched by said protection key fetching means, means for transferring a key fetched by said protection key from said local storage unit into a selected one of said protection key registers, means for fetching a key from the local storage unit with a portion of the address utilized by said main storage unit access means in accessing said main storage unit, comparison means, including a mode register, for comparing a key within a register selected by a said selection means, to a key fetched by said storage key fetching means which corresponds to the address utilized in accessing said main storage unit, means, responsive to a noncomparison signal from said comparison means for developing a signal for preventing alternation of data at an accessed location within said main storage unit.

3. In a data processing system having a main data storage unit, means for accessing data in said main data storage unit, and means for developing a signal useable for protecting data in predetermined areas of said main storage unit from inadvertent alteration, comprising, an auxiliary storage unit containing channel control words relating to data, at a main storage address which is accessed by said main storage unit accessing means, means for accessing at least one of said channel control words in said auxiliary storage unit, a local storage unit, means for fetching a protection key from the local storage unit with the low order portion of the address utilized in accessing a channel control word from said auxiliary storage unit, a plurality of protection key registers, means for selecting a protection key register for receiving a protection key fetched by said protection key fetching means, means for transferring a key fetched by said protection key fetching means from said local storage unit into a selected one of said protection key registers, means for fetching a storage key from the local storage unit with the high order portion of the address utilized in accessing said main storage unit, comparison means, including a mode register, for comparing a protection key within a register selected by said selection means to a storage key fetched by said storage key fetching means in accordance with the address utilized in accessing said main storage unit, means, responsive to a noncomparison signal from said comparison means, for developing a signal for preventing alteration of data at an accessed location within said main storage unit.